United States Patent
Ford et al.

(10) Patent No.: US 6,820,419 B2
(45) Date of Patent: Nov. 23, 2004

(54) MARINE WET EXHAUST SYSTEM

(75) Inventors: John R. Ford, Xenia, OH (US); Ken Harstel, Thomasville, GA (US); Ernie Beckwith, Sr., Oahlocknee, GA (US)

(73) Assignee: Centek Industries, Inc., Thomasville, GA (US)

( * ) Notice: Subject to any disclaimer, the term of this patent is extended or adjusted under 35 U.S.C. 154(b) by 0 days.

(21) Appl. No.: 10/182,019

(22) PCT Filed: Dec. 20, 2001

(86) PCT No.: PCT/US01/50454

§ 371 (c)(1),
(2), (4) Date: Nov. 5, 2002

(87) PCT Pub. No.: WO02/49912

PCT Pub. Date: Jun. 27, 2002

(65) Prior Publication Data

US 2003/0121253 A1 Jul. 3, 2003

Related U.S. Application Data

(60) Provisional application No. 60/298,845, filed on Jun. 15, 2001, provisional application No. 60/260,274, filed on Jan. 8, 2001, and provisional application No. 60/257,468, filed on Dec. 21, 2000.

(51) Int. Cl.⁷ .............................................. F01N 3/04
(52) U.S. Cl. ............................. 60/310; 60/297; 60/311; 181/220; 440/89 R; 440/89 B; 440/89 F
(58) Field of Search .......................... 60/274, 310, 311, 60/297; 181/220, 221, 235, 259, 260; 440/88 R, 89 R, 89 A, 89 B, 89 F; 96/245; 137/567, 2; 210/610, 637; 95/288

(56) References Cited

U.S. PATENT DOCUMENTS

| | | | |
|---|---|---|---|
| 3,759,041 A | 9/1973 | North et al. | |
| 4,072,168 A | * 2/1978 | Wittenmyer | 137/567 |
| 4,713,029 A | 12/1987 | Ford | |
| 4,738,781 A | * 4/1988 | Word et al. | 210/637 |
| 5,022,877 A | 6/1991 | Harbert | |
| 5,078,631 A | 1/1992 | Harbert | |
| 5,196,655 A | 3/1993 | Woods | |
| 5,207,251 A | 5/1993 | Cooks | |
| 5,339,854 A | * 8/1994 | Leith | 137/2 |
| 5,411,665 A | * 5/1995 | Scraggs et al. | 210/610 |
| 5,437,793 A | 8/1995 | Alper | |
| 5,702,276 A | 12/1997 | Nakase et al. | |
| 5,746,630 A | 5/1998 | Ford et al. | |
| 5,814,133 A | * 9/1998 | Hunter et al. | 95/288 |
| 5,837,146 A | 11/1998 | Alper | |
| 5,857,324 A | * 1/1999 | Scappatura et al. | 60/311 |
| 5,961,823 A | 10/1999 | Alper | |
| 5,980,344 A | 11/1999 | Widmann | |
| 6,010,378 A | 1/2000 | Fujimoto et al. | |
| 6,024,617 A | 2/2000 | Smullin et al. | |
| 6,180,010 B1 | 1/2001 | Alper | |
| 6,200,179 B1 | * 3/2001 | Widmann et al. | 440/89 R |
| 6,226,984 B1 | * 5/2001 | Ford | 60/310 |
| 2003/0037678 A1 | * 2/2003 | Payne et al. | 96/245 |

OTHER PUBLICATIONS

Mycelx Technologies Corporation, Mycelx Product Information Internet Brochure 2001, 5 pages, www.mycelx.com.

* cited by examiner

Primary Examiner—Tu M. Nguyen
(74) Attorney, Agent, or Firm—Hessler & Vanderburg (57) ABSTRACT

A marine wet exhaust system (10) which injects water into the exhaust flow for cooling and attenuating noise includes a particulate capture and containment system (14) for removing particulates and fluid contaminants from the exhaust gas and the waste cooling water of the discharge. With a first embodiment, this is accomplished by separating the waste cooling water and entrained particulates from the exhaust gas in a muffler/separator (912); accumulating the waste cooling water and entrained particulates in a reservoir (52); and separating the entrained particulates from the waste cooling water in a filter (50). The system further includes a reservoir discharge pump assembly (54), a reservoir drain line (86) and a bleed line (74) to maintain water levels in the reservoir and the filter. With a second embodiment, a condensate trap (56) separates particulates and condensates from the de-watered exhaust gas and returns them to the reservoir (52).

9 Claims, 6 Drawing Sheets

MARINE WET EXHAUST SYSTEM

CROSS REFERENCE TO RELATED APPLICATIONS

Priority filing benefit of International PCT application PCT/US01/50454, filed Dec. 20, 2001, and published in the English language on Jun. 27, 2002 with International Publication No. WO 02/49912 A1; and U.S. Provisional Application Ser. Nos. 60/257,468 filed Dec. 21, 2000; 60/298,845 filed Jun. 15, 2001 and 60/260,274 filed Jan. 8, 2001.

BACKGROUND OF THE INVENTION

The present invention pertains to exhaust systems for water craft internal combustion engines; more particularly, it pertains to improved marine wet exhaust systems for reducing the emission of particulate materials and petroleum based contaminants into the environment.

Internal combustion engines commonly used to power water craft generate power through rapid combustion of organic fuels and the resulting expansion of the combustion products against pistons coupled to drive shafts. The combustion products typically include particulates capable of polluting the surrounding air or water. The periodic combustion, expansion and discharge of the combustion products also produce undesirable heat and noise in the exhaust flow from the engine. Such internal combustion engines are also used to drive generators to produce electrical energy to supply the electrical systems on board the water craft. The marine wet exhaust system herein described is applicable to all such internal combustion engines so installed on marine water craft.

Water craft internal combustion engines typically use the water supporting the craft for cooling purposes. The water is drawn into the water craft engine, via an engine driven cooling water supply pump, and circulated through an engine cooling jacket or engine coolant heat exchanger. After circulating through the engine cooling jacket, the water is commonly injected into the exhaust system to cool the combustion products and exhaust gases for safe discharge through the hull of the craft, thereby minimizing fire hazard. Accordingly, a marine wet exhaust system must handle not only exhaust gases, but also the waste cooling water which is injected into the exhaust system.

One drawback to such systems is that the rate at which the water is drawn in by the cooling water supply pump likely differs from the rate at which water can be discharged through the marine wet exhaust system, possibly resulting in undesired pressure gradients or accumulations of water in the marine wet exhaust system.

The exhaust gases flowing out of the water separation component will have very high water content in vapor form. The gases may also contain unburned fuel in vapor form. As these gases travel downstream toward the exhaust terminus, they are cooled. The cooling is nearly always sufficient to cause condensation of both the water vapor and the fuel vapor. This process results in liquid condensates that will be included in the gas flow from what might have been expected to be a dry exhaust gas terminus.

In many installations, this can be very objectionable, particularly if the so-called dry exhaust gas outlet has been positioned over a deck or other space on board the craft where the accumulation of such liquids would be very undesirable.

In addition to safely handling exhaust gases and waste cooling water, a marine wet exhaust system should muffle or attenuate the exhaust noise generated by operation of the marine craft engine. Muffling of exhaust noise from marine engines has been handled in a number of ways. For example, the exhaust may be discharged below the water level. In outboard engines, and in inboard/outdrive installations, the exhaust is sometimes routed through the drive unit so that the exhaust gas and waste cooling water are discharged through or adjacent the propeller driving the craft. An exhaust system including a water separator for use in outboard drive units with exhaust routed through the propeller under the water line is proposed in North et al., U.S. Pat. No. 3,759,041, the disclosure of which is incorporated herein by reference.

In other systems, the wet exhaust flows through muffler/separators which remove at least a portion of the cooling water from the exhaust flow. Secondary mufflers are often placed along the exhaust conduit running between such muffler/separators and the exhaust gas line termini to further attenuate the exhaust noise. One such muffler is proposed in Harbert, U.S. Pat. No. 5,022,877, the disclosure of which is incorporated herein by reference.

Marine mufflers are generally constructed of materials such as fiberglass which can tolerate the exhaust gases and cooling water. While currently available fiberglass mufflers are popular in the boating industry, many do not provide good attenuation of the noise generated by marine engines. Furthermore, such mufflers often do not adequately separate water from the exhaust gases, even if they are designed to perform any water separation at all.

Catalytic converters have been used in land vehicles to adsorb or otherwise remove particulates from automotive internal combustion engine exhaust flows. Such devices are less practical in marine craft, however, inasmuch as the very high temperatures necessary for the reduction processes in catalytic converters cannot be tolerated in the less efficiently ventilated engine spaces of marine craft.

Additionally, within marine craft, the engine and muffler are often mounted amidship and located as far as 30 ft. to 40 ft. (9 m. to 12 m.) from the exhaust terminus. At these lengths, it is difficult to maintain an overall downward grade necessary to drain the waste coolant water separated from the exhaust flow solely by means of gravity. In practice, the exhaust conduit leading from the muffler to the exhaust terminus may curl up-and-down as it crosses various sections of the marine craft, creating traps where water may accumulate and constrict the exhaust gas flow.

Consequently, there remains a need for a reliable and effective marine wet exhaust system capable of attenuating exhaust noise and capable of separating waste cooling water from the exhaust gases before the waste cooling water and dewatered exhaust gases are discharged into the environment. There is an even more specific need for such a system that is also capable of separating and retaining particulates and other petroleum based contaminants from the waste cooling water and the dewatered exhaust gas before discharging either into the environment.

SUMMARY OF THE INVENTION

These needs and others are addressed, in accordance with the invention, by means of a preferred marine wet exhaust system including a separator and a particulate capture and containment system. The preferred separator receives an exhaust gas and waste cooling water mixture with entrained particulates and other petroleum based contaminants. It functions to separate at least a portion of the waste cooling water with the entrained particulates from the exhaust gas.

A first preferred particulate capture and containment system includes a reservoir interposed between the separator and the filter. The filter receives the waste cooling water with the entrained particulates and serves to separate most of the particulates from the waste cooling water. The reservoir serves as a buffer to allow the flow rate through the filter to differ from the flow rate through the water supply pump.

In accordance with an especially preferred embodiment, a reservoir discharge pump is interposed between the reservoir and the filter to control the water level in the reservoir. According to one form of the invention, the reservoir discharge pump is switched ON and OFF by means of a suitable level sensor, such as a level sensing tube, communicating with the interior of the reservoir. The preferred level sensor detects minimum and maximum desired water levels in the reservoir and selectively activates the reservoir discharge pump so as to maintain the water level within a neighborhood of those bounds. According to another form of the invention, the reservoir discharge pump is a variable rate pump operating in response to a controller so as to match the rate of the variable rate reservoir discharge pump to the rate at which the cooling water supply pump is drawing water into the preferred marine wet exhaust system. One advantage of the use of a variable speed pump is that it allows the capacity of the reservoir to be reduced in comparison with the capacity otherwise required; indeed, it is within the contemplation fo the invention to replace the reservoir with a suitable variable speed pump.

It is well known that the life of a pump driven by an electrically powered motor is affected significantly by the number of ON and OFF duty cycles to which the motor is subjected. An improvement to the marine wet exhaust system in accordance with the present invention, incorporates a pressure transducer connected to a level sensing tube appropriately positioned in the reservoir. The output of the transducer is transmitted to a variable flow rate controller. This controller, in turn, varies the speed of an electric motor driving the reservoir discharge pump. The level of water in the reservoir can thus be maintained within closer limits than with use of an ON/OFF switching means alone. Running the reservoir discharge pump motor continually, with automatic speed variations, tends to improve the life of the electric motor.

In accordance with another especially preferred embodiment, the marine wet exhaust system includes a reservoir drain line communicating between the reservoir and an exterior of the craft. Even more preferably, the reservoir is sealed in a confined space isolated from other interior spaces of the craft. In the event that the reservoir discharge pump fails and automatic control of the water level in the reservoir is lost, there is a risk that excess water will flood the interior spaces and adversely affect the operation of the craft. In such an event, the confined space serves to contain the excess water and the reservoir drain line provides a flow path for conducting such excess water overboard. Additionally, during normal operation, the reservoir drain line provides a flow path for discharging exhaust gases, if any, which fail to separate from the waste cooling water in the separator.

In accordance with yet another especially preferred embodiment, the marine wet exhaust system includes a bleed line, most preferably a small gauge bleed line, communicating between the upper portion of the interior of the filter housing and the reservoir. It has been found that the effectiveness, and therefore the useful life, of the filter elements within the filter housing are maximized by providing a means for keeping the filter elements completely submerged in water at all times. Due to minor leaks in the system piping, or more often by the inclusion of air or other gases in the water that is being pumped from the reservoir to the filter housing, air or other gases can accumulate in the upper portions of the filter housing. These accumulated gases displace water that normally would cover the extremities of the filter element. The bleed line provides a vent through which the entrapped air or other gases can escape to the reservoir, which, in turn, communicates to atmosphere, thereby maximizing the effectiveness and useful life of the filter element.

Another improvement to the marine wet exhaust system is the use of a filter element infused with an organic coagulant medium such as MYCELX® filter compound, available from Mycelx Technologies Corporation of Gainesville, Ga. The filter cartridge, so infused, has the capability of absorbing very high amounts of diesel and gasoline range organic materials. The effluent from the filter likely will contain less than one part per million of these petroleum based contaminants. There is minimal increase in the pressure differential across the filter as the contaminant level absorbed by the filter increases, as is the case in many other filters or filter media used in similar applications. This results in negligible decrease in the flow rate as the filter element approaches saturation with removed contaminants.

A second preferred particulate capture and containment system includes an exhaust gas conduit communicating with the separator and a condensate trap located within, or near, a terminus of the exhaust gas conduit. The preferred condensate trap includes a housing defining first and second chambers. The first chamber defines spaced inlet and outlet lines. A condensate trap drain line communicates with the second chamber. A plurality of passageways, most preferably defined by slots or other appropriately configured openings of various configurations, communicate between the first and second chambers. Most preferably, the first chamber is substantially cylindrical; the condensate trap is positioned such that an axis defined by the first chamber lies no more than 45° from horizontal; and the passageways are downwardly directed, so as to induce relatively dense fluids and particulates to pass from the first chamber to the second chamber through the passageways under the influence of gravity.

The condensate trap serves to separate particulates and condensates from the de-watered exhaust gases discharging through the exhaust conduit. The de-watered exhaust gases which flow from the inlet line to the outlet line through the first chamber of the condensate trap are rich in condensed diesel or other fuel used in the engine as well as entrained particulates. Rather than emit these particulates and other condensates to the environment, the condensates and particulates are induced to pass from the first chamber to the second chamber through the passageways. The liquid and particulates accumulate in the second chamber and ultimately exit through the condensate trap drain line to the reservoir, so as to either settle in the reservoir or be captured in the filter.

Therefore, it is one object of the invention to provide a reliable and effective marine wet exhaust system capable of attenuating exhaust noise. It is another object of the invention to provide a marine wet exhaust system capable of separating particulates and other contaminants from exhaust gases and waste cooling water before the de-watered exhaust gases and the waste cooling water are discharged into the environment. In accordance with the first preferred embodiment, this is accomplished by separating the waste cooling water and entrained particles from the exhaust gas in the separator; accumulating the waste cooling water and entrained particulates in the reservoir; and separating the entrained particulates from the waste cooling water in the filter. Means including the reservoir discharge pump, the reservoir drain line and the bleed line serve to control the water levels in the reservoir and the filter so as to improve the operation of the marine wet exhaust system. In accordance with the second embodiment, the condensate trap separates particulates and condensates from the de-watered exhaust gas, most preferably returning the particulates and condensates to the reservoir and then to the filter where they will be entrapped.

The present invention will be further described in the appended drawings, following detailed description and the appended claims.

DETAIL DESCRIPTION

Figure 1:
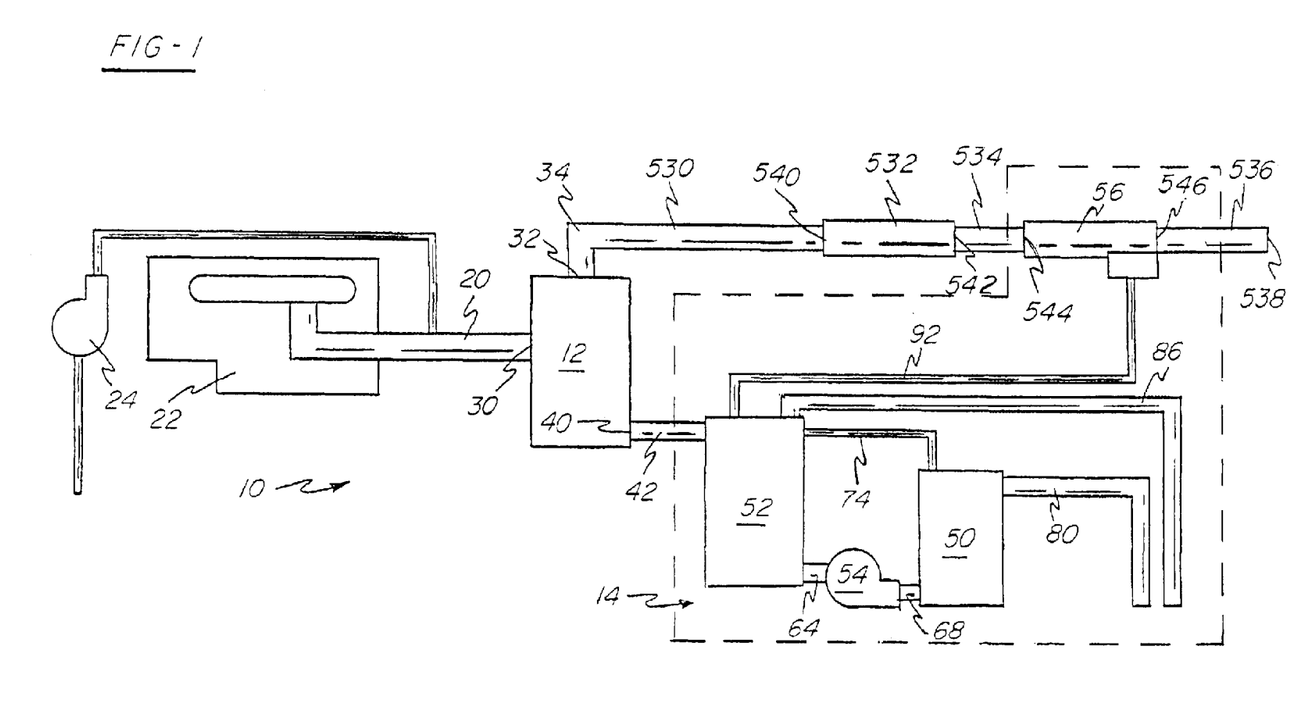
FIG. 1 is a schematic view of a marine wet exhaust system in accordance with the present invention.

FIG. 1 depicts a wet exhaust system 10 for a marine craft (not shown) comprising a muffler/separator 12 and a particulate capture and containment assembly 14 in accordance with the present invention. More particularly, the preferred wet exhaust system 10 further includes an exhaust conduit 20 for conducting an exhaust flow (not shown) from an internal combustion engine 22 to an inlet 30 of the muffler/separator 12; and a cooling water supply pump 24 for drawing cooling water (not shown) from the water surrounding the craft (not shown) and injecting the cooling water (not shown) into the exhaust conduit 20. Most preferably, the cooling water (not shown) is injected into the exhaust flow in droplet form. The droplets of cooling water (not shown) both cool the exhaust flow and attenuate some noise.

The preferred muffler/separator 12 separates at least a significant portion of the cooling water (not shown) from the exhaust gas (not shown) and also attenuates exhaust noise. The muffler/separator 12 has a first outlet 32 connected to a first de-watered exhaust gas conduit 34 for discharge of de-watered exhaust gas (not shown) and a second outlet 40 connected to a first waste cooling water conduit 42 for discharge of waste cooling water (not shown) separated from the de-watered exhaust gas (not shown). The preferred embodiment of the present invention may include any one of a number of known muffler/separators and the configuration of the muffler/separator 12 is not critical to the present invention.

The preferred particulate capture and containment system 14 includes a filter 50; a reservoir 52 interposed between the muffler/separator 12 and the filter 50; a reservoir discharge pump 54 assembly interposed between the reservoir 52 and the filter 50 to regulate the flow of waste cooling water (not shown) from the reservoir 52 to the filter 50; and a condensate trap 56. The filter 50 serves to remove particulates and other contaminants from the waste cooling water (not shown). The reservoir 52 serves as a buffer to allow the flow rate through the filter 50 to differ from the flow rate through the water supply pump 24 and entering the muffler/separator 12. The reservoir discharge pump assembly 54 serves to regulate the waste cooling water level in the reservoir 52 and the flow rate of waste cooling water (not shown) from the reservoir 52 to the filter 50.

Figure 2:
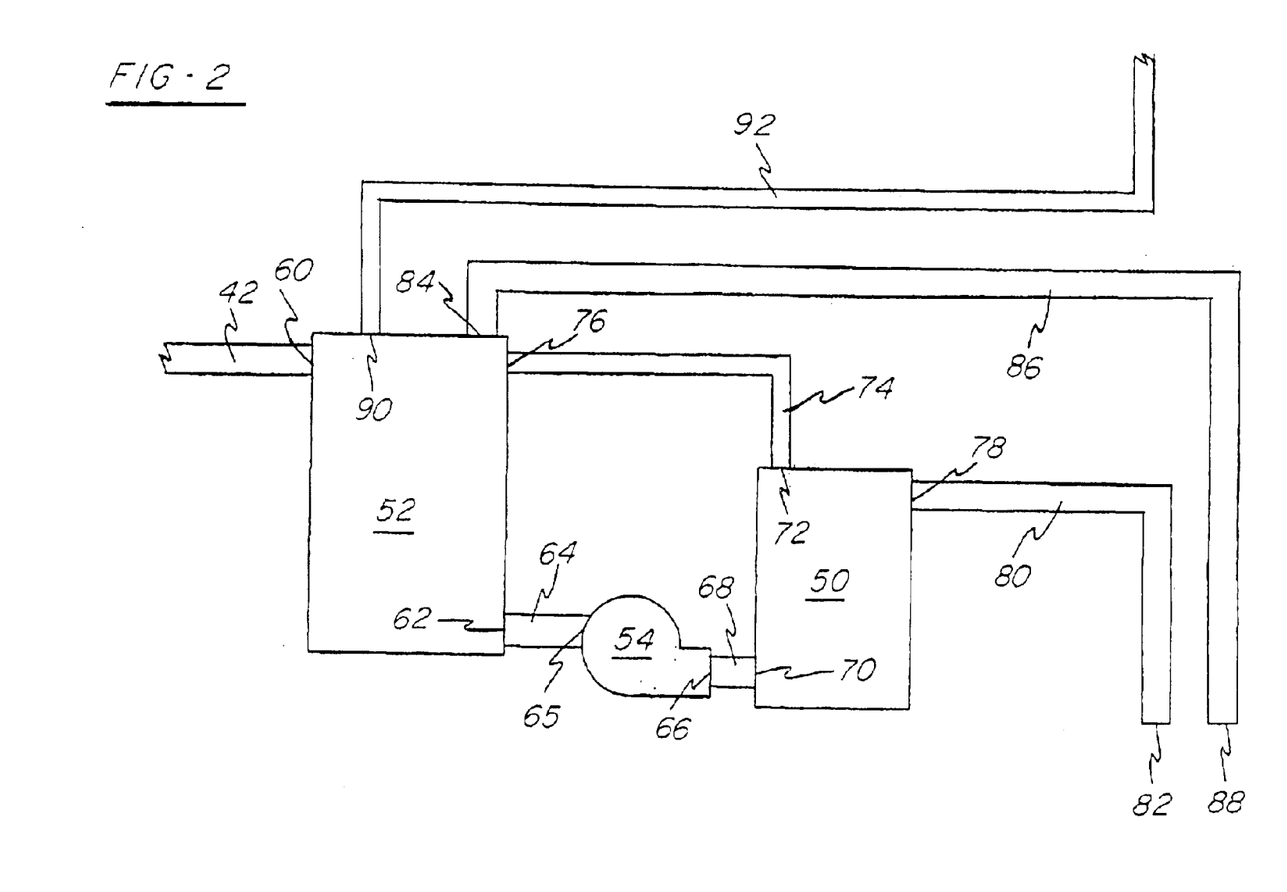
FIG. 2 is a schematic view of a portion of a preferred particulate capture and containment system for the marine wet exhaust system of FIG. 1.

More particularly, as best shown in FIG. 2, the waste cooling water conduit 42 communicates with the reservoir 52 through a reservoir waste cooling water inlet 60. The reservoir 52 communicates through a reservoir discharge outlet 62, a discharge pump inlet conduit 64 and a discharge pump inlet 65 with the reservoir discharge pump assembly 54. The reservoir discharge pump assembly 54 communicates through a discharge pump outlet 66, a discharge pump outlet conduit 68 and a filter inlet 70 with the filter 50. Conversely, the filter 50 communicates through a filter bleed outlet 72, a filter bleed line 74 and a reservoir bleed inlet 76 with the reservoir 52. The filter 50 communicates through a filter discharge outlet 78 and a filter discharge conduit 80 with the exterior of the craft (not shown) at a waste cooling water line terminus 82. The reservoir 52 communicates through a reservoir drain outlet 84 and a reservoir drain line 86 with the exterior of the craft (not shown) at a reservoir drain terminus 88. Finally, the condensate trap 56 (FIG. 1) communicates with the reservoir 52 through a condensate trap drain inlet 90 coupled to a condensate trap drain line 92.

The waste cooling water (not shown) exiting the second outlet 40 of the muffler/separator 12 includes residual particulates, in solid and liquid form. The preferred particulate capture and containment assembly 14 in accordance with the present invention serves to receive the waste cooling water (not shown); capture such particulates and contaminants (not shown); and discharge substantially particulate-free waste cooling water (not shown).

Figure 3:
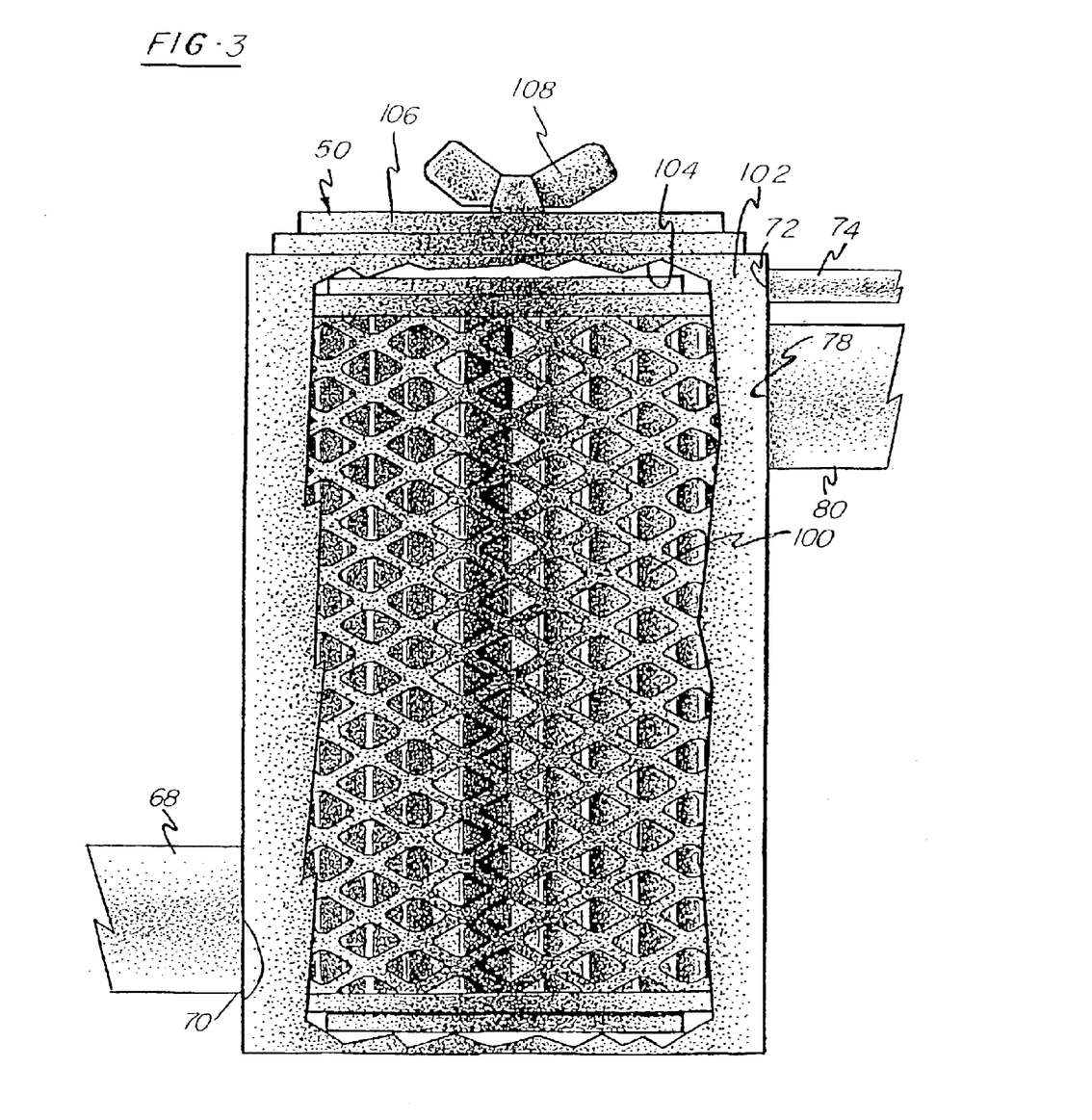
FIG. 3 is a side sectional view of a preferred filter for use in the marine wet exhaust system of FIG. 1, including a bleed line in accordance with the present invention.

As shown in FIG. 3, the preferred filter 50 includes a replaceable filter element 100 enclosed in a filter housing 102. The preferred filter element 100 is a filter cartridge infused or impregnated with an organic coagulant such as with MYCELX® filter compound so as to enable the filter element 100 to absorb very high amounts of organic contaminants such as diesel-range or gasoline-range organic molecules. The preferred filter housing 102 defines an opening 104 communicating with an interior of the filter housing 102 for removing and replacing the filter element 100. The opening 104 preferably is covered by a filter lid 106 secured in fluid-tight relation with the filter housing 102 by a nut 108 or the like during operation. Most preferably, the filter inlet 70 is positioned near a lower region of the filter housing 102 and the filter discharge outlet 78 is positioned near an upper region of the filter housing 102.

In operation, the filter 50 captures particulates and other contaminants (not shown) from the waste cooling water (not shown) and discharges the waste cooling water through the filter discharge line 80. The captured particulates and other contaminants (not shown) are contained within the filter element 100. When the filter element 100 becomes saturated, it is removed through the opening 104 in the filter housing 102. This allows the particulates (not shown) to be disposed of in an environmentally friendly manner along with the filter element 100 when the filter element 100 becomes saturated. A new filter element 100 is then placed within the filter housing 102.

Figure 4:
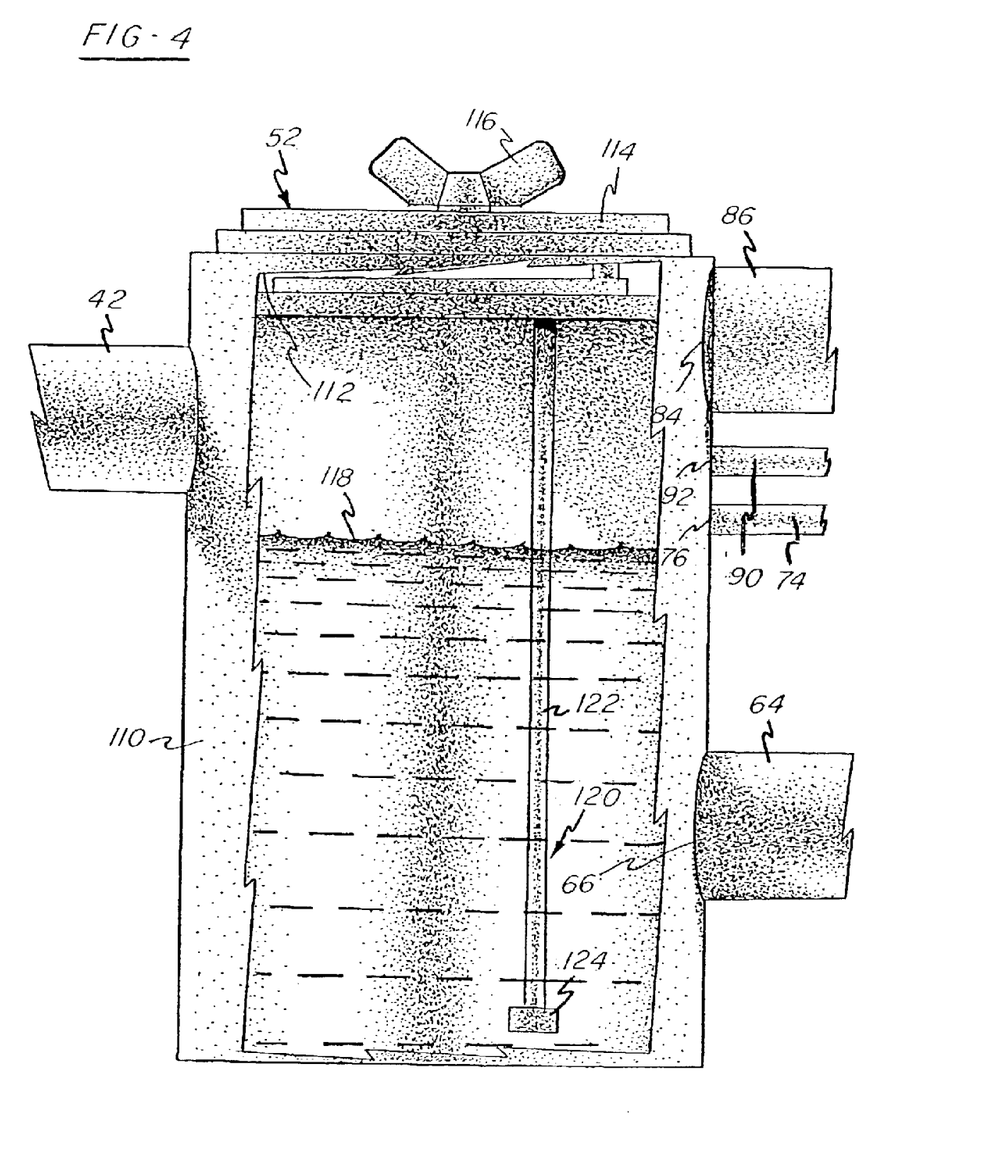
FIG. 4 is a side sectional view of a preferred reservoir for use in the marine wet exhaust system of FIG. 1, including a waste cooling water inlet, a level sensing tube, a pressure transducer, a reservoir drain line outlet, a bleed line inlet, a condensate trap drain line inlet and waste cooling water outlet.

As shown in FIG. 4, the preferred reservoir 52 comprises a reservoir housing 110 defining an opening 112. The opening 112 preferably is covered by a reservoir lid 114 secured in fluid-tight relation with the filter housing 110 by a nut 116 or the like during operation so as to contain a body 118 of the waste cooling water. The reservoir 52 serves as a buffer to allow the flow rate through the filter 50 (FIGS. 1–3) to differ from the flow rate through the water supply pump 24 (FIG. 1) and the muffler/separator 12 (FIG. 1). Any difference between the volume flow through the water supply pump 24 (FIG. 1) and the volume flow through the filter 50 (FIGS. 1–3) is stored in, or released from, the reservoir 52.

One or more sensors 120 are positioned in the filter housing 110 to monitor the body 118 of the waste cooling water. Most preferably, the sensors 120 include a water level sensing tube 122, alone or in combination with a pressure transducer 124, although those skilled in the art will recognize that the particular choice of sensors 120 is not critical to the invention. The inside diameter of the preferred level sensing tube 122 is slightly larger than the corresponding dimension of the preferred pressure transducer 124. Anticipating that the body 118 of waste cooling water in the reservoir 52 will be subject to external disturbances during operation of the associated marine craft (not shown), the pressure transducer 124 most preferably is positioned within the level sensing tube 122 where the waste cooling water (not shown) surrounding the pressure transducer 124 likely will be less turbulent. As depicted in FIGS. 1, 2 and 4, it is desirable that the reservoir discharge outlet 66 be positioned below an anticipated elevation of the body 118 of the waste cooling water in the reservoir 52 and above the elevation of the pressure transducer 124.

Figure 5:
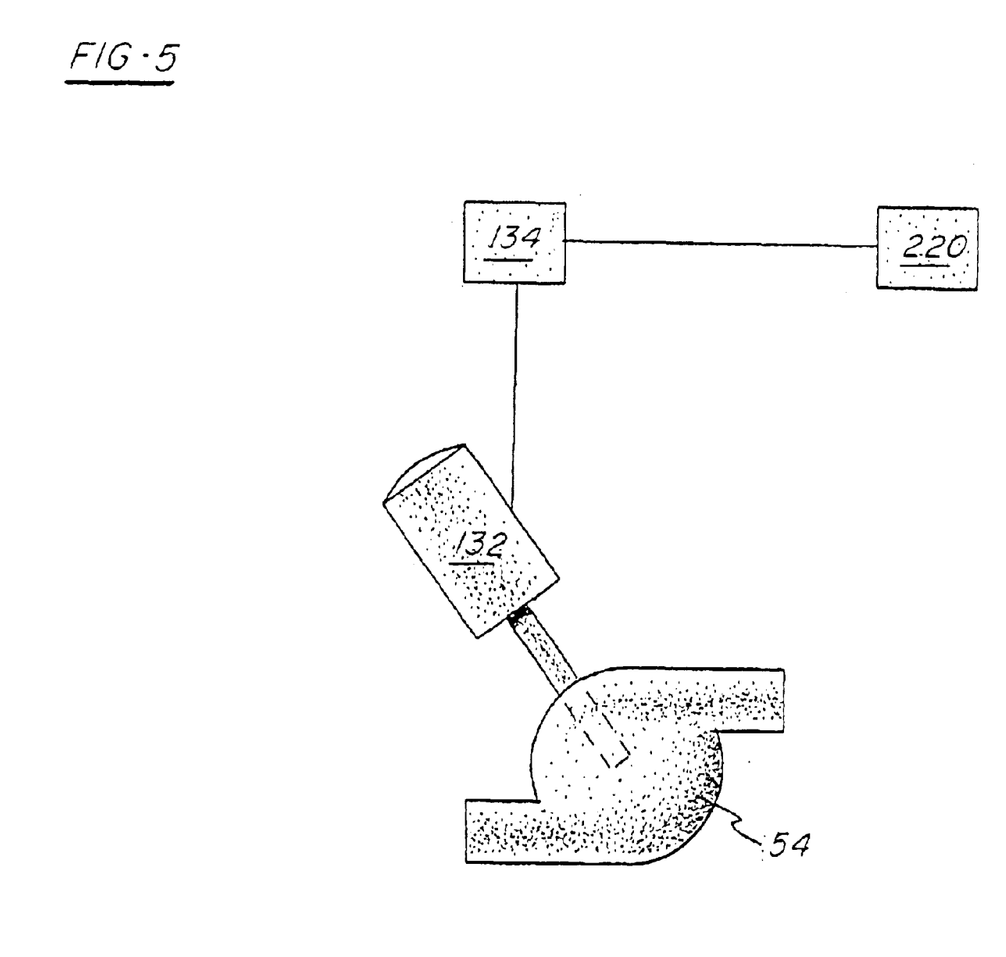
FIG. 5 is a block diagram of a reservoir discharge pump assembly for use in the marine wet exhaust system of FIG. 1.

As shown in FIG. 5, the preferred reservoir discharge pump assembly includes a pump 54; a motor 132, most preferably an electric motor, for driving the pump 54; a pump controller 134 for controlling the motor 132; and the sensors 220. Suitable pumps 54 and motors 132 include pumps and motors that can operate either at a single speed or at variable speed.

The reservoir discharge pump assembly serves to regulate the level of the body 118 of waste cooling water in the reservoir 52 (FIGS. 1, 2 and 4). Various methods for controlling the reservoir discharge pump assembly 54 will be apparent to those of ordinary skill in the art and it will be appreciated that the particular mode of control selected is not critical to the invention.

In accordance with one embodiment, where the pump 54 and the motor 132 are such as to operate at a single speed, the pump controller 134 preferably comprises an ON/OFF controller. Most preferably, the water level sensing tube 122 (FIG. 4) is positioned so as to generate electric signals indicative of when the level of the body 118 (FIG. 4) of the cooling water in the reservoir 52 approaches pre-determined minimum and maximum water levels. Under these circumstances, it is desirable for the pump controller 134 to selectively activate the motor 132 and the pump 54 so as to maintain the level of the body 118 (FIG. 4) of the cooling water in the reservoir 52 (FIG. 4) within a neighborhood of the minimum and maximum water levels.

In accordance with another embodiment, where the pump 54 and the motor 132 are such as to operate at variable speed, the pump controller 134 preferably comprises a variable speed controller. Most preferably, the level sensing tube 122 (FIG. 4) and the pressure transducer 124 (FIG. 4) are positioned within the reservoir 52 (FIG. 4) so as to generate electric signals indicative of the depth of the body 118 (FIG. 4) of the cooling water in the reservoir 52 (FIG. 4) and the pressure within the reservoir 52 (FIG. 4). The pump controller 134 responds to these signals by varying the speed of the motor 132 to provide especially close control of the level of the body 118 (FIG. 4) of waste cooling water in the reservoir 52 (FIG. 4). Since the motor 132 runs continuously while the system is receiving waste cooling water (not shown) from the muffler/separator 12, the life of the reservoir discharge pump assembly 54 is improved. Furthermore, such an arrangement permits the reservoir 52 to operate with a smaller capacity than otherwise, thereby saving space within the interior (not shown) of the craft (not shown).

Returning to FIG. 2, the reservoir 52 may be omitted. For example, it is within the contemplation of the invention to operate the discharge pump 54 as a variable speed pump and to connect the waste cooling water conduit 42 directly to the discharge pump inlet 65 without the intervention of the reservoir 52. In the absence of the reservoir 52, it is desirable to monitor the flow rate through the cooling water supply pump 24 (FIG. 1) and entering the muffler/separator 12 (FIG. 1) by means of a suitable electronic sensor (not shown), and to vary the flow rate through the reservoir discharge pump assembly 54 so as to substantially match the flow rate of the cooling water entering the muffler/separator 12 (FIG. 1).

It has been observed that the effectiveness and the useful life of the filter element 100 (FIG. 3) is improved when the filter element 100 (FIG. 3) is kept completely submerged in waste cooling water (not shown) within the filter housing 102 (FIG. 3). Use of variable speed control, as opposed to ON/OFF control, in the reservoir discharge pump assembly serves to maintain the waste cooling water level (not shown) in the filter housing 102 (FIG. 3) at an optimum level so as to ensure that the filter element 100 (FIG. 3) is completely and constantly submerged.

Due to minor leaks in the piping of the marine wet exhaust system 10 (FIG. 1), and more especially, due to the inclusion of air or other gases (not shown) in the waste cooling water (not shown) discharged from the muffler/separator 12 (FIG. 1), such air or other gases (not shown) can accumulate in an upper region of the filter housing 102 (FIG. 3). The accumulation of gases (not shown) in the upper region of the filter housing 102 (FIG. 3) displaces the waste cooling water (not shown) that would normally cover the upper extremities of the filter element 100 (FIG. 3), with deleterious effect on the life of the filter element 100 (FIG. 3). The filter bleed line 74 serves to conduct such accumulated air and other gases (not shown) from the upper region of the filter housing 102 back to the reservoir 52, thereby cooperating with the reservoir discharge pump assembly 54 to keep the filter element 100 completely and continuously submerged in waste cooling water (not shown). The preferred filter bleed line 74 is of small gauge and is positioned above the upper edge of the filter element 100.

Preferably, the reservoir 52 is sealed in a confined space (not shown) isolated from other interior spaces of the craft (not shown). In the event that the reservoir discharge pump assembly 54 fails and automatic control of the level of the body 118 (FIG. 3) of waste cooling water in the reservoir 52 is lost, there is a risk that excess water will flood the interior spaces and adversely affect the operation of the craft. In such an event, the reservoir drain line 86 provides a flow path for conducting such excess water (not shown) overboard. Additionally, during normal operation, the reservoir drain line 86 provides a flow path for discharging exhaust gases (not shown), if any, which failed to separate from the waste cooling water in the muffler/separator 12 (FIG. 1).

Returning to FIG. 1, the preferred marine wet exhaust system 10 further includes a first de-watered exhaust gas conduit 530; a secondary muffler 532; a second de-watered exhaust gas conduit 534; the condensate trap 56; and a third de-watered exhaust gas conduit 536 communicating with an exhaust gas line terminus 538. The muffler/separator 12 communicates through the first outlet 32, the first de-watered exhaust gas conduit 530 and a secondary muffler inlet 540 with the secondary muffler 532. The secondary muffler 532 communicates through a secondary muffler outlet 542, the second de-watered exhaust gas conduit 534 and a condensate trap inlet 544 with the condensate trap 56. The condensate trap 56 communicates through a condensate trap discharge outlet 546, the third de-watered exhaust gas conduit 536 and the exhaust gas line terminus 538 with the exterior of the craft (not shown). In addition, the condensate trap 56 communicates through the condensate trap drain line 92 with the reservoir 52.

The dewatered exhaust gas exiting the first outlet 32 of the muffler/separator 12 includes residual particulates (not shown), in solid and liquid form, which were not removed from the exhaust flow by the muffler/separator 12, along with vaporized contaminants (not shown), such as water and fuel vapors, which generally are not separable utilizing a muffler/separator 12. The preferred particulate capture and containment system 14 serves to receive the de-watered exhaust gases (not shown); capture such particulates and condensates of the previously vaporized contaminants (not shown); and discharge substantially particulate-free dewatered exhaust gas.

The secondary muffler 532 provides noise attenuation in addition to that provided by the muffler/separator 12. Preferred secondary mufflers for use in the marine wet exhaust system 10 include any commercially available marine mufflers, including so-called "dry mufflers." Exemplary mufflers are proposed in Ford U.S. Pat. No. 4,713,029, the disclosure of which is incorporated herein by reference. Those skilled in the art will appreciate that the secondary muffler 532 is optional to the preferred marine wet exhaust system 10 and is not critical to the present invention.

The preferred condensate trap 56 is located close to the exhaust gas line terminus 538 and serves to remove particulates and other contaminants (not shown), including condensates of the previously vaporized contaminants, prior to the expulsion of the de-watered exhaust gas (not shown) from the marine wet exhaust system 10. The particulates and other contaminants (not shown) captured by the condensate trap 56 are conveyed by the condensate trap drain line 92 to the reservoir 52.

Figure 6:
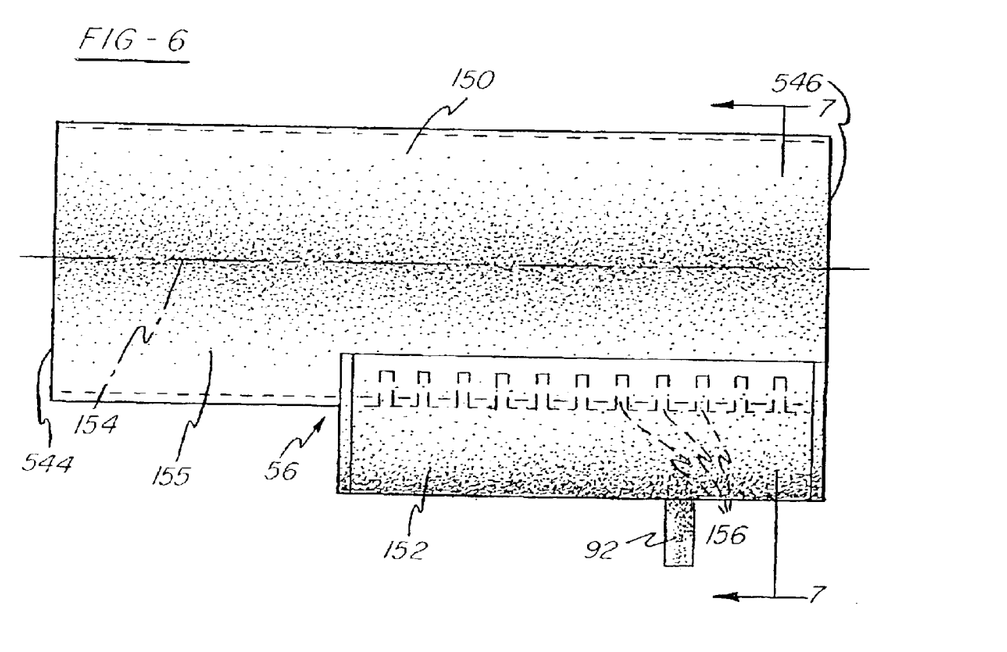
FIG. 6 is a side view of a preferred condensate trap for use in the marine wet exhaust system of FIG. 1 including a condensate trap drain line.

As shown in FIG. 6, the preferred condensate trap 56 includes a condensate trap housing 150 defining a first or main flow chamber 155 and a second or collecting chamber 152. The first chamber 155 is preferably substantially cylindrical, defining an axis 154; the condensate trap inlet 544 near a first end of the axis 154; and the condensate trap discharge outlet 546 near a second end of the axis 154. Most preferably, the inner diameter of the first chamber 155 is such as to receive the second and third exhaust gas conduits 534, 536 (FIG. 1) at the condensate trap inlet and discharge outlet 544, 546, respectively.

Figure 7:
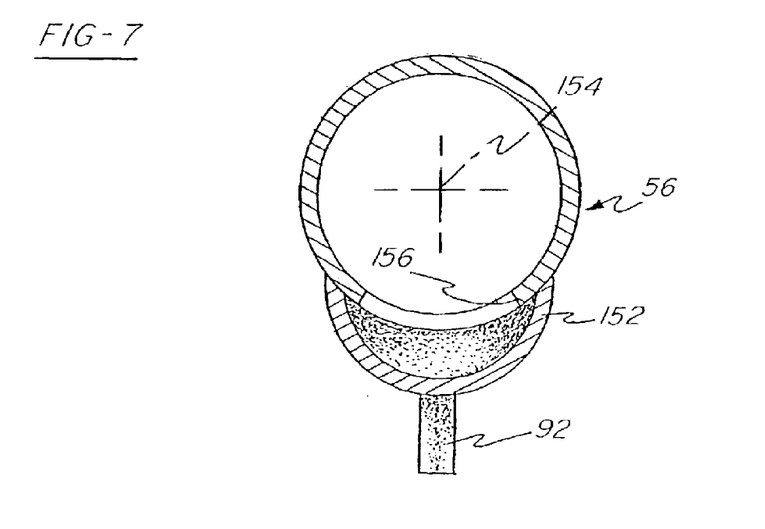
FIG. 7 is a sectional view of the condensate trap of FIG. 6, taken along line 7—7 of FIG. 6.

The first chamber 155 preferably communicates with second chamber 152 through at least one, and preferably a plurality, of annular slots or otherwise configured passageways 156. Those skilled in the art will appreciate that the configuration of the passageways 156 is not critical to the invention and that various configuration will be apparent to those of ordinary skill in the art. Most preferably, the first chamber 155 is oriented such that an axis 154 lies no more than 45° from horizontal. The passageways 156 preferably are downwardly directed so as to induce relatively dense fluids and particulates (not shown) entrained with the de-watered exhaust gas (not shown) to pass from the first chamber 155 to the second chamber 152 through the passageways 156 under the influence of gravity.

The second chamber 152 communicates with the condensate trap drain line 92. The relatively dense fluids and particulates (not shown) which pass from the first chamber 155 to the second chamber 152 accumulate in the second chamber 152 and ultimately exit through the condensate trap drain line 92 to the reservoir 52 (FIG. 1). Most preferably, the condensate trap 56 is positioned above the condensate trap drain inlet 90 to the reservoir 52 and such that the condensate trap drain line 92 defines a continually downward path from the second chamber 152 to the condensate trap drain inlet 90.

With reference to FIG. 1, it may be desirable in certain circumstances for the first de-watered exhaust gas conduit 530 to extend from the first outlet 32 of the muffler/separator 12 to the exhaust gas line terminus 538 without the intervention of a secondary muffler 532 or a condensate trap 56. Thus, it is within the scope of the present invention to provide a particulate capture and containment assembly 14 with no condensate trap 56, just as it is within the scope of the invention to employ a condensate trap 56 independently of one or more of the filter 50, the reservoir 52 and the reservoir discharge pump assembly 54. However, in most applications, it will be desirable to include a condensate trap 56 so as to remove condensates of water and fuel (not shown) which are able to pass through muffler/separator 12 in vapor form.

As suggested by the foregoing, the marine wet exhaust system 10 in accordance with the present invention includes a particulate capture and containment system 14 which serves to separate and collect particulate materials (not shown) and petroleum-based contaminants (not shown) from a marine exhaust flow, thereby significantly reducing the amount of such particulates arid contaminants (not shown) released by the marine wet exhaust system 10. The marine wet exhaust system 10 further provides for the regulation of waste cooling water levels (not shown) in the reservoir 52 and the filter 50.

In another aspect of the invention, the filter element 100 (FIG. 3) can be impregnated with an oil coagulant to enhance separation of organic based foulants from the water ultimately discharged through conduit 80 to the aqueous environment. These coagulants are discussed in detail in U.S. Pat. No. 6,180,010 (Alper); U.S. Pat. No. 5,837,146 (Alper); U.S. Pat. No. 5,437,793 (Alper) and U.S. Pat. No. 5,961,823 (Alper). The contents of these patents are incorporated by reference herein. Preferred coagulants are sold under the MYCELX® trademark by Mycelex Technologies, Gainesville, Ga.

Having described the invention in detail and by reference to preferred embodiments thereof, it will be apparent that modifications and variations are possible without departing from the scope.

What is claimed is:

1. A marine wet exhaust system comprising:
   a) a separator for receiving an exhaust gas and waste cooling water mixture with entrained particulates and for at least partially separating the waste cooling water with entrained particulates from said exhaust gas;
   b) a filter for receiving the waste cooling water with entrained particulates and separating at least a portion of said particulates from said waste cooling water;
   c) a reservoir connected between said separator and said filter for providing a buffer between said separator and said filter; and
   d) a bleed line communicating between an upper region of said filter and said reservoir.

2. The marine wet exhaust system as recited in claim 1 further comprising a secondary muffler communicating with said separator.

3. A marine wet exhaust system comprising:
   a) a separator for receiving an exhaust gas and waste cooling water mixture with entrained particulates and for at least partially separating the waste cooling water with entrained particulates from said exhaust gas;
   b) an exhaust gas terminus;
   c) a condensate trap interposed between said separator and said exhaust gas line terminus; and
   d) wherein said condensate trap comprises a first chamber in communication with said separator and said exhaust gas line terminus, a second chamber, and at least one passageway communicating between said first and second chambers; said first chamber being substantially cylindrical and defining an axis; said axis being oriented at no more than 45° from horizontal; and said at least one passageway being directed downwardly so as to induce remaining particulates to pass from said first chamber to said second chamber through said at least one passageway under the influence of gravity.

4. A marine wet exhaust system comprising:
   a) a muffler/separator for receiving an exhaust gas and waste cooling water mixture with entrained particulates and for at least partially separating the waste cooling water with entrained particulates from said exhaust gas;
   b) a filter for receiving the waste cooling water with entrained particulates and separating said particulates from said waste cooling water;
   c) a reservoir connected between said separator and said filter for providing a buffer between said separator and said filter;
   d) a reservoir drain line communicating with said reservoir;
   e) a bleed line communicating between an upper region of said filter and said reservoir;
   f) a reservoir discharge pump assembly interposed between said filter and said reservoir, said reservoir discharge pump assembly including a sensor and a pump responsive to said sensor for maintaining a level of waste cooling water in said reservoir;
   g) a condensate trap communicating with said muffler/separator; and
   h) an exhaust gas line terminus, said condensate trap being positioned near said exhaust gas line terminus.

5. The marine wet exhaust system as recited in claim 4 wherein said filter includes a filter element infused with MYCELX® filter compound.

6. The marine wet exhaust system as recited in claim 4, wherein said sensor includes a level sensor positioned in said reservoir, said reservoir discharge pump assembly includes an ON/OFF pump controller in electrical communication with said level sensor, and said pump is responsive to said ON/OFF controller to maintain the level of waste cooling water in said reservoir.

7. The marine wet exhaust system as recited in claim 4, wherein said sensor includes a level sensor and a pressure transducer positioned in said reservoir; said reservoir discharge assembly includes a pump controller in electrical communication with said level sensor and said pressure transducer; and said pump is a variable speed pump responsive to said pump controller to maintain the level of waste cooling water in said reservoir.

8. The marine wet exhaust system as recited in claim 4, wherein said condensate trap comprises a first chamber in communication with said separator and said exhaust gas line terminus, a second chamber, at least one passageway communicating between said first and second chambers, and a condensate trap drain line communicating between said second chamber and said reservoir.

9. The marine wet exhaust system as recited in claim 4, wherein said condensate trap comprises a first chamber in communication with said separator and said exhaust gas line terminus, a second chamber, at least one passageway communicating between said first and second chambers, and a condensate trap drain line communicating between said second chamber and said reservoir; said first chamber being substantially cylindrical and defining an axis; said axis being oriented at no more than 45° from horizontal; said passageways being directed downwardly so as to induce remaining particulates to pass from said first chamber to said second chamber through said passageways under the influence of gravity; and said second chamber being positioned above said reservoir so as to induce at least a portion of said remaining particulates to pass from said second chamber to said reservoir through said condensate trap drain line under the influence of gravity.

* * * * *